July 10, 1928.
A. H. HANDLAN
LANTERN
Filed Oct. 12, 1925
1,676,861
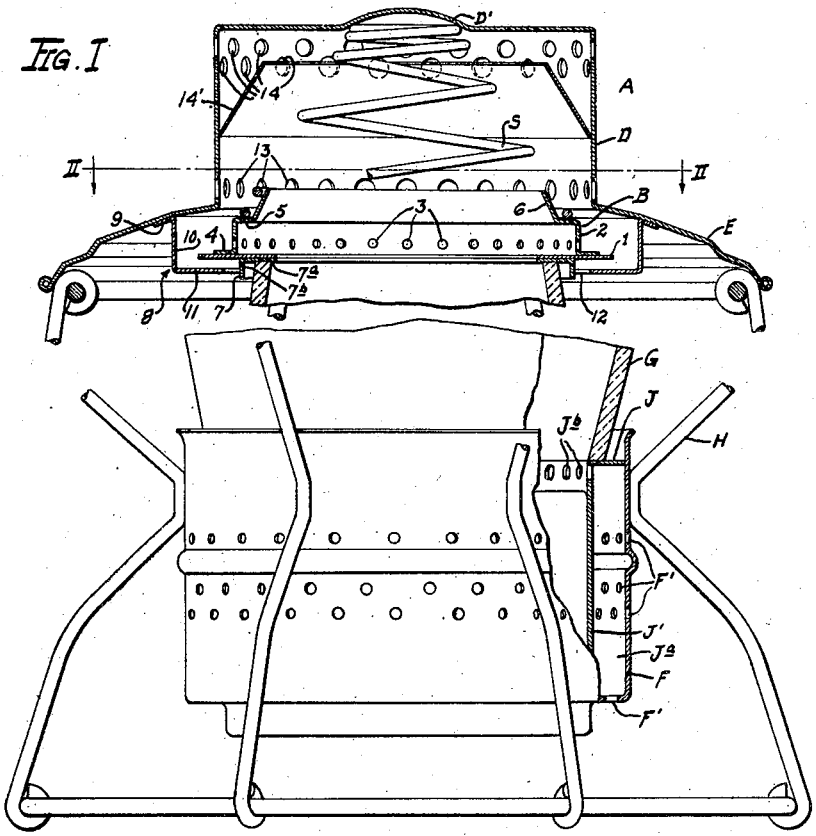
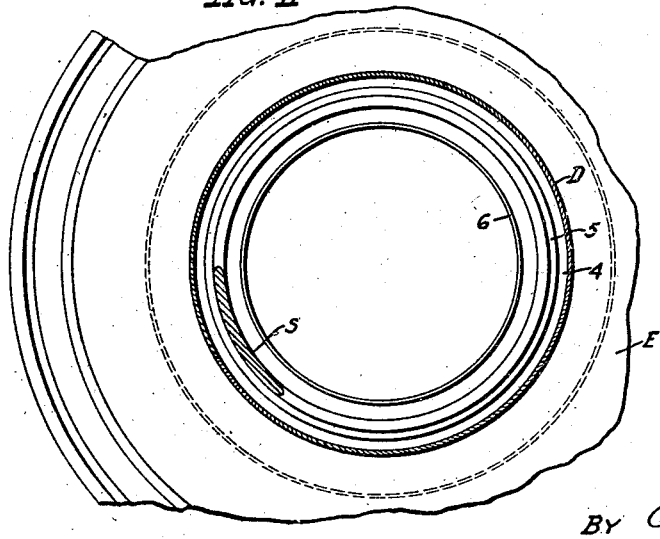
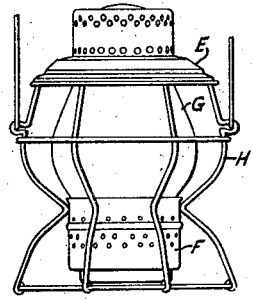
INVENTOR
A. H. HANDLAN
BY Cobb McCauley
ATTORNEYS Patented July 10, 1928.

1,676,861

UNITED STATES PATENT OFFICE.

ALEXANDER H. HANDLAN, OF ST. LOUIS, MISSOURI.

LANTERN.

Application filed October 12, 1925. Serial No. 61,966.

This invention relates generally to hand lanterns, and particularly to the type of hand lanterns used by trainmen for transmitting signals, an object of the invention being to produce a hand lantern provided with improved means for positively holding the lantern globe so as to prevent the ingress of air currents between the bottom face of the globe and its seat.

Prior to this invention lanterns have been constructed with a seat for the base of the globe and an annular spring-pressed globe holder engaging the upper portion of the globe. The spring-pressed globe holder was adapted to slide within the dome longitudinally thereof, and its function was to force the globe downwardly onto its seat while at the same time centrally positioning the upper portion of the globe with respect to the dome. If the lantern frame is perfectly formed no trouble is experienced with air currents entering the lantern between the globe and its bottom seat, but in practice it is found that many of the lantern frames are not perfectly formed, this condition usually being caused by said lantern frames being accidentally bent while they are still hot after being dipped in molten tin.

In the case of a lantern the frame of which is perfectly formed, the center of the globe seat and the center of the globe holder are in positive alinement with the longitudinal axis of the globe and when this condition exists the globe is perfectly centered within the lantern and close contact is obtained between the bottom face of the globe and the globe seat. Assume now, however, that the lantern frame were accidentally bent before the lantern gets into service, so that the globe holder is not in alinement with the globe seat. The result of this would be that the off-center globe holder would pull the top portion of the globe to one side when said globe holder is moved into contact with said top portion of said globe, and as a consequence a part of the bottom face of said tilted globe would be drawn off of the globe seat, thus leaving a space between the bottom face of the globe and the globe seat.

In giving certain signals it is imperative that the air enter the lantern only at points of ingress definitely determined in order that the flame may be sustained, thus permitting it to burn brightly. If during the giving of these signals a current of air be permitted to enter the lantern between the globe and its seat, the flame will be dimmed or probably completely extinguished. It is essential to avoid danger that the flame of the lantern be as nearly constant at all times as possible, and it is the particular object of my invention to produce a lantern having a globe holder capable of automatic adjustment, so that every lantern embodying my invention will have its globe positively seated on its seat, in spite of slight imperfections in the alinement of the globe seat and globe holder.

Another object of my invention is to produce a lantern particularly adapted to burn kerosene and which is so constructed as to provide for the proper control of air at the upper and lower parts of the lantern body, so that the light within the lantern may be maintained when the lantern is being swung about to transmit signals, at which time varying currents of air are produced within the lantern body.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a fragmentary view of my improved lantern, partly in vertical section and partly in elevation.

Fig. II is a fragmentary cross section taken on line II—II of Fig. I and looking in the direction indicated by the arrows.

Fig. III is a side elevation of my lantern on a very much reduced scale showing the short globe associated therewith.

In the drawing A designates a hand lantern of the type used by trainmen, which lantern is provided with an oil font holder F secured in any suitable manner, as for instance by welding, to a guard frame H, and said oil font holder is provided with air induction ports F'. J designates a globe seat which is arranged within the oil font holder F and is adapted to receive the bottom face of the lantern globe G, a wall J' being extended downwardly from the inner edge of said globe seat J to provide an annular air space $J^a$ between the side wall of the oil font holder and said wall J'. In the use of a lantern made in accordance with my invention air to sustain the flame passes through the ports F' into the space J<sup>a</sup> and through ports J<sup>b</sup> in the wall J' to the interior of the globe G. D designates the dome of the lantern which is usually pivotally connected to the guard frame H, and said dome is ordinarily provided with a suitable latching device so that it may be fastened in a closed position, but as the latching device and the arrangement of hinging the dome to the guard frame are common, they have not been shown in the drawing.

B designates my improved globe holder, or wind break, as it is usually called, which comprises an annular plate 1 arranged transversely of the lantern, the opening within said plate being approximately alined within the interior of the globe to permit the upward movement of air and vapors through said globe. Arranged adjacent to the plate 1 at the top face thereof is an annular member comprising an annular vertical wall 2 provided with an annular row of perforations 3 and having at its lower end a circumferential flange 4 arranged parallel with the plate 1, said circumferential flange being secured in any suitable manner, as by welding or soldering, to said annular plate 1. Located at the upper end of the annular vertical wall 2 is an annular horizontal flange 5, and extended inwardly and upwardly from the inner edge of said horizontal flange 5 is an annular inclined shield 6. The vertical wall 2, horizontal walls 4 and 5 and shield 6 are preferably, though not necessarily, all formed integral. 7 designates an annular plate, L-shaped in cross section, which is secured to the lower face of the plate 1, the annular wall 7<sup>a</sup> of said plate being arranged parallel with said plate 1 and functioning as a seat for the top face of the lantern globe G and the associated annular wall 7<sup>b</sup> extending downwardly from said plate 1 and surrounding the upper end portion of the lantern globe G. By referring to Fig. I it will be noted that the plate 7 provides a pocket in which the upper portion of the globe G is seated.

S designates a coil spring, preferably conical in shape, which is interposed between the top wall of the dome D and the annular horizontal wall 5, said top wall of said dome being provided with a depression D' in which the upper end of the coil spring is seated, and the lower end of said spring being in firm contact with said annular horizontal wall 5. In view of the arrangement just described and shown in Fig. I, it is apparent that the spring S tends to force the globe holder of the lantern in a downward direction and into firm contact with the top face of the lantern globe G.

8 designates an annular cup-shaped member which is secured by welding or otherwise to the breast portion E of the dome D at the inner face thereof, said cup-shaped member comprising an annular flange 9 parallel and in contact with said breast portion E, a vertically arranged annular wall 10 and a horizontal wall 11. The horizontal wall 11 of the member 8 is provided with a circular opening 12 of greater diameter than the diameter of the annular plate 7, and said plate 7 extends through said opening, as shown in Fig. I, and is capable of moving laterally therein.

By referring to Fig. I of the drawing, it will be noted that the annular vertical wall of the dome D is provided with a row of perforations 13 adjacent to the lower end of said wall and a pair of rows of perforations 14 adjacent to the upper end of said wall. Because of the arrangement of the perforations 13 and 14, the vertical annular wall of the dome is provided with an imperforate portion between the row of perforations at the lower end of the wall and the pair of rows of perforations at the upper end of said wall. The presence of this imperforate portion is of the utmost importance, in that it provides a chamber in which a body of air in a relatively quiet state is maintained, which body of air tends to cause a breaking up, diffusion and checking of the undesirable air currents within the dome, thus preventing disturbance of the frame. Arranged within the dome D and secured to the wall thereof is an annular inclined baffle 14' which is intended to deflect upwardly any air which enters the dome through the perforations 14.

When the dome of a lantern constructed in accordance with my invention is being moved to a closed position, the globe holder B will contact with the top face of the lantern globe G, and because of the arrangement thereof the globe holder will move to a position where it contacts firmly with the top face of the globe at all points of said top face. If the frame of the lantern is imperfectly formed so that the center of the globe holder is not alined with the center of the globe seat when said globe holder is in the center of the dome, the globe holder will move laterally, with respect to the dome, or will otherwise automatically adjust itself so that it contacts firmly with the top faces of the globe. It is apparent, therefore, that because of the ability of the globe to move universally the globe holder will always be in firm contact with the top face of the globe, in spite of the fact that the top face of the globe is not in the center of the dome, and as a result of this the bottom face of said globe will always be in firm contact with the globe seat. The coil spring S is preferably cone-shaped, as has already been stated, and for this reason the smaller end of said coil spring, which is seated on the curved depression D', may act as a pivot, thus providing for free lateral movement of the larger end of said spring, the opening 12 in the wall 11 being large enough to permit corresponding lateral movement of the globe holder.

In the use of my improved lantern air will pass through the opening 12 around the peripheral edge of the plate 1 upwardly to the upper portion of the lantern dome. Also, some of this air will pass through the openings 3 in the wall 2 of the globe holder. The result of this is that there is always a sufficient amount of fresh air within and adjacent to the globe holder to maintain the flame when a downward movement of vapor within the globe is caused. Also, it will be noted that the perforations 13 are so arranged that cross currents of air passing through the dome of the lantern will be baffled by the shield 6 and will be deflected upwardly. The arrangement of the air ports of my improved lantern results in the scientific control of the air passing into the lantern body whereby the light in the lantern is maintained constant at all times while the lantern is in use.

I claim:

1. A lantern having a dome, a globe, a seat for the bottom face of said globe, and a spring-pressed globe holder, said globe holder including an annular portion arranged transversely of the lantern, and an annular housing secured to said dome and enclosing the marginal edge portion of said annular portion of said globe holder, said annular housing being provided with a wall which overlaps said annular portion of said globe holder.

2. A lantern having a dome, a globe, a seat for the bottom face of said globe, and a spring-pressed globe holder, said globe holder including an annular portion arranged transversely of the lantern, and an annular housing approximately cup-shaped in cross section secured to said dome and enclosing the marginal edge portion of said annular portion of said globe holder, said housing being provided with a bottom annular wall which overlaps the marginal edge portion of the annular portion of said globe holder.

3. A lantern having a dome, a globe, a seat for the bottom face of said globe, and a spring-pressed globe holder, said globe holder including an annular portion arranged transversely of the lantern, and a housing secured to said dome and enclosing said annular portion of said globe holder, the diameter of said housing being considerably greater than the diameter of said annular portion of said globe holder to permit said annular portion to move transversely within said housing.

4. A lantern having a globe, a globe seat, an oil font holder within which said globe seat is arranged, a wall within said oil font holder and spaced apart from a wall thereof to provide a space, said wall within said oil font holder and a wall of said oil font holder being provided with perforations through which air may pass, a dome provided with perforations at its top, a baffle adjacent to said perforations, a spring-pressed globe holder, said dome being provided with perforations at its lower end, and a shield on said spring-pressed globe holder, said shield being disposed opposite to the last mentioned perforations and being adapted to deflect air entering the dome therethrough.

In testimony that I claim the foregoing I hereunto affix my signature.

ALEXANDER H. HANDLAN.